United States Patent
Said et al.

(10) Patent No.: US 10,382,711 B2
(45) Date of Patent: Aug. 13, 2019

(54) METHOD AND DEVICE FOR PROCESSING GRAPH-BASED SIGNAL USING GEOMETRIC PRIMITIVES

(71) Applicant: LG Electronics Inc., Seoul (KR)

(72) Inventors: Amir Said, San Jose, CA (US); Hilmi Enes Egilmez, San Jose, CA (US)

(73) Assignee: LG Electronics Inc., Seoul (KR)

( * ) Notice: Subject to any disclaimer, the term of this patent is extended or adjusted under 35 U.S.C. 154(b) by 44 days.

(21) Appl. No.: 15/514,305

(22) PCT Filed: Jun. 24, 2015

(86) PCT No.: PCT/KR2015/006430
§ 371 (c)(1),
(2) Date: Mar. 24, 2017

(87) PCT Pub. No.: WO2016/047897
PCT Pub. Date: Mar. 31, 2016

(65) Prior Publication Data
US 2017/0257579 A1    Sep. 7, 2017

Related U.S. Application Data

(60) Provisional application No. 62/055,661, filed on Sep. 26, 2014.

(51) Int. Cl.
*G06K 9/36* (2006.01)
*H04N 5/357* (2011.01)
(Continued)

(52) U.S. Cl.
CPC .............. *H04N 5/357* (2013.01); *G06K 9/36* (2013.01); *G06T 9/00* (2013.01); *G06T 9/008* (2013.01);
(Continued)

(58) Field of Classification Search
CPC .. G06K 9/36; G06T 9/00; G06T 9/008; G06T 9/20; H04N 19/14; H04N 19/593; H04N 5/217; H04N 5/357
See application file for complete search history.

(56) References Cited

U.S. PATENT DOCUMENTS 8,538,175 B1 * 9/2013 Epstein .................. H04N 19/20
                                                                    382/232
2011/0206288 A1    8/2011 Lee et al.
(Continued)

FOREIGN PATENT DOCUMENTS

JP    S63146676 A    6/1988
JP    S63184479 A    7/1988
(Continued)

OTHER PUBLICATIONS

"Selective Rendering of Specific Volume using a Distance Transform and Data Intermixing Method for Multiple Volumes," http://www.dbpia.co.kr/Journal/PDFView?id=NODE00610622: p. 1
(Continued)

*Primary Examiner* — Bhavesh M Mehta
*Assistant Examiner* — Ian L Lemieux
(74) *Attorney, Agent, or Firm* — Fish & Richardson P.C.

(57) ABSTRACT

Disclosed herein is a method of processing a graph-based signal using a geometric primitive, comprising: specifying the geometric primitive to be used for calculating an edge weight; obtaining a parameter for each of the geometric primitive; calculating an edge weight for each of edges within the image based on the parameter; and encoding the image based on the edge weight.

11 Claims, 11 Drawing Sheets

(51) Int. Cl.
  *G06T 9/00*    (2006.01)
  *H04N 19/14*   (2014.01)
  *H04N 19/593*  (2014.01)
  *G06T 9/20*    (2006.01)
  *H04N 5/217*   (2011.01)

(52) U.S. Cl.
  CPC ............... *G06T 9/20* (2013.01); *H04N 5/217* (2013.01); *H04N 19/14* (2014.11); *H04N 19/593* (2014.11)

(56) References Cited

U.S. PATENT DOCUMENTS

| | | | | |
|---|---|---|---|---|
| 2012/0314949 | A1* | 12/2012 | Grady | G06T 7/11 382/173 |
| 2013/0272422 | A1* | 10/2013 | Lee | H04N 19/00781 375/240.18 |
| 2015/0254822 | A1* | 9/2015 | Levy | G06T 5/009 382/264 |
| 2015/0332472 | A1* | 11/2015 | Govindarao | G06T 7/97 382/226 |
| 2015/0363664 | A1* | 12/2015 | Chang | G06K 9/46 382/164 |
| 2017/0339422 | A1* | 11/2017 | Said | H04N 19/13 |
| 2018/0041760 | A1* | 2/2018 | Koo | H04N 19/96 |
| 2018/0167618 | A1* | 6/2018 | Lee | H04N 19/176 |

FOREIGN PATENT DOCUMENTS

| | | |
|---|---|---|
| JP | H11008848 A | 1/1999 |
| JP | 2000040966 A | 2/2000 |
| JP | 2004048306 A | 2/2004 |
| KR | 1020070003613 | 1/2007 |
| KR | 10-0810326 | 3/2008 |
| KR | 10-2010-0044977 | 5/2010 |
| KR | 10-2012-0079357 | 7/2012 |
| KR | 10-2012-0134615 | 12/2012 |
| KR | 1020140104029 | 8/2014 |

OTHER PUBLICATIONS

Narang et al., "Critically Sampled Graph-based Wavelet Transforms for Image Coding," IEEE, Signal and Information Processing Association Annual Summit and Conference, 2013, pp. 1-4.

Extended European Search Report in European Application No. 15845140.1, dated Apr. 26, 2018, 6 pages.

* cited by examiner

[Figure 1]
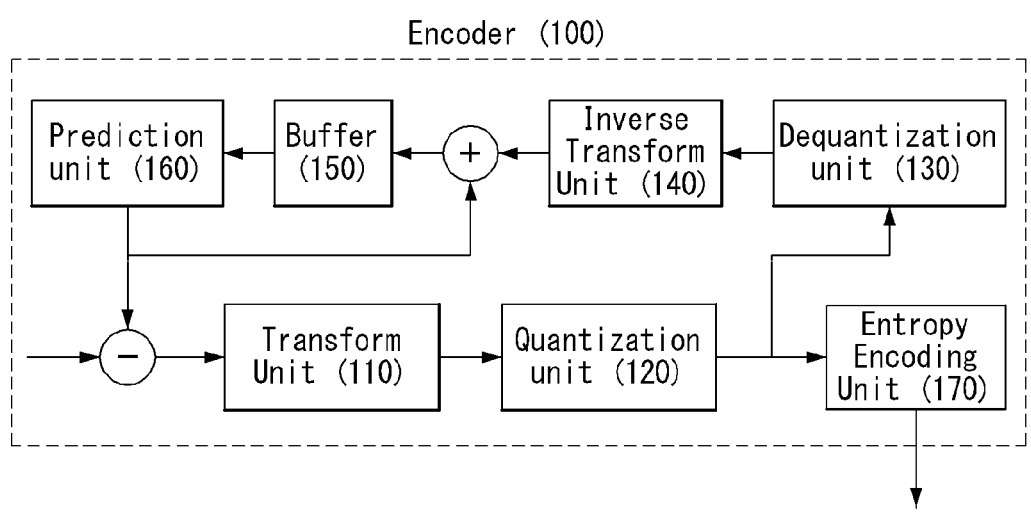

[Figure 2]
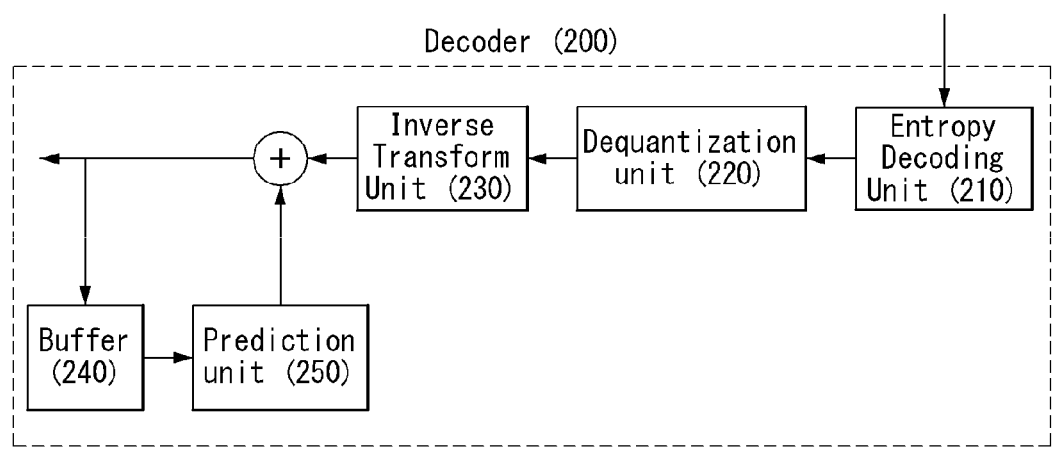

【Figure 3】
(a)
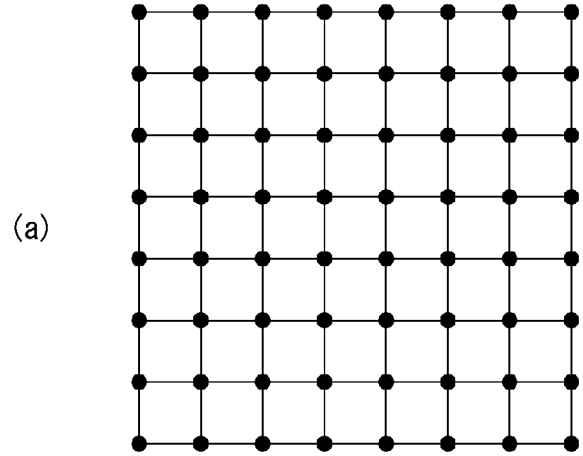
(b)
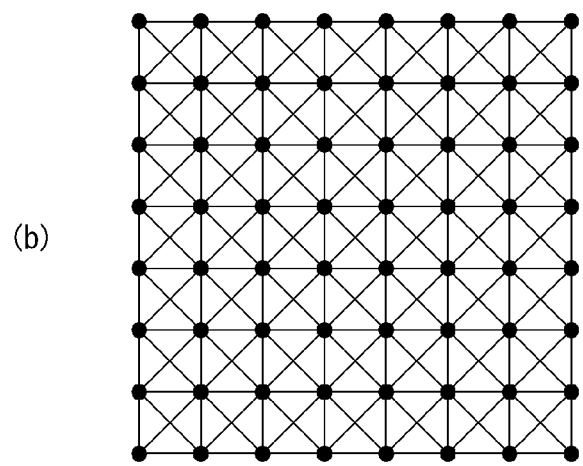

【Figure 4】
(a) 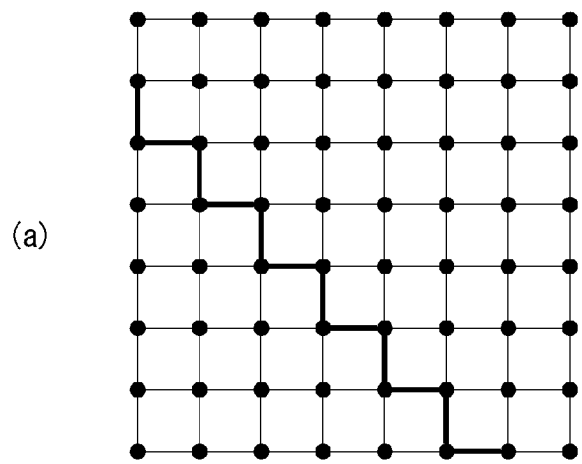
(b) 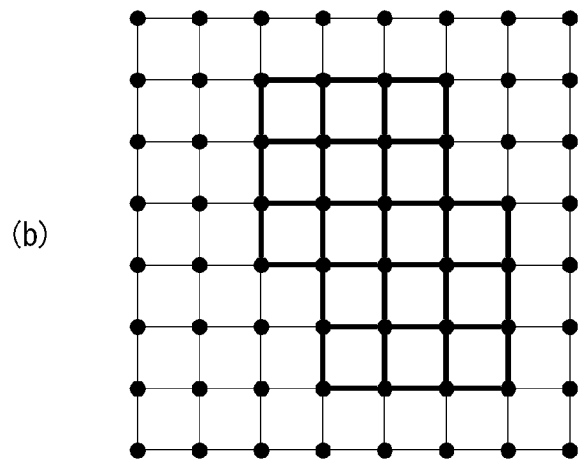

【Figure 5】
(a)
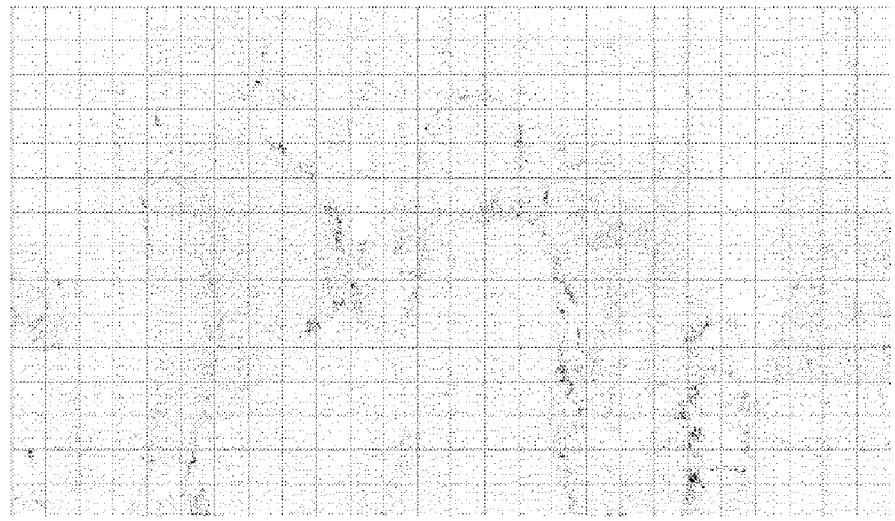
(b)

[Figure 6]
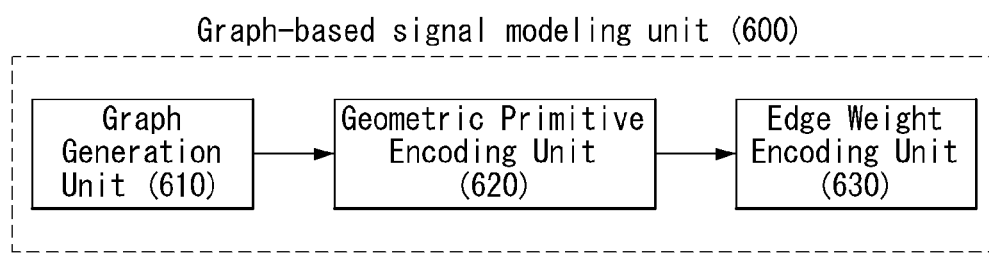

【Figure 7】
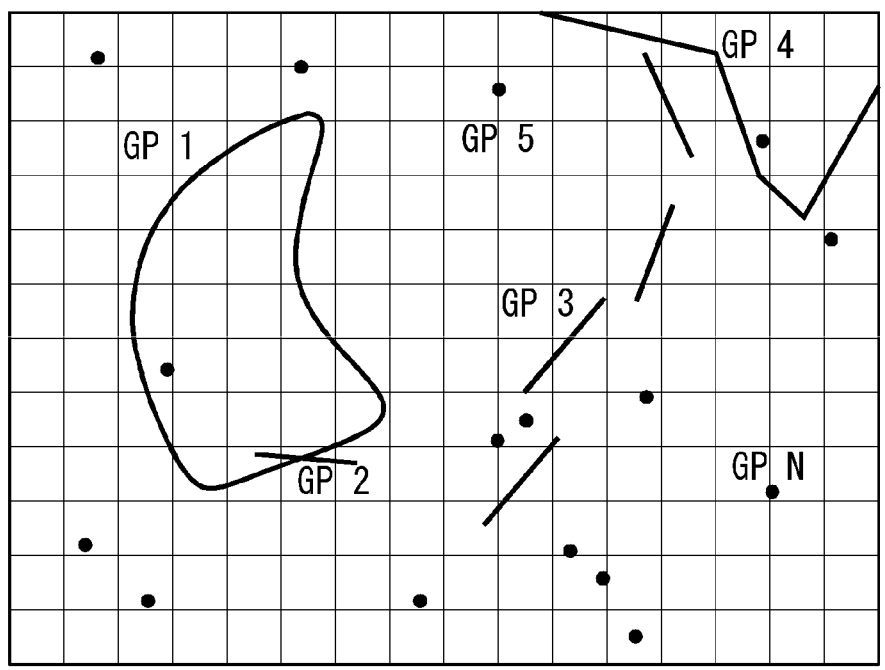

【Figure 8】
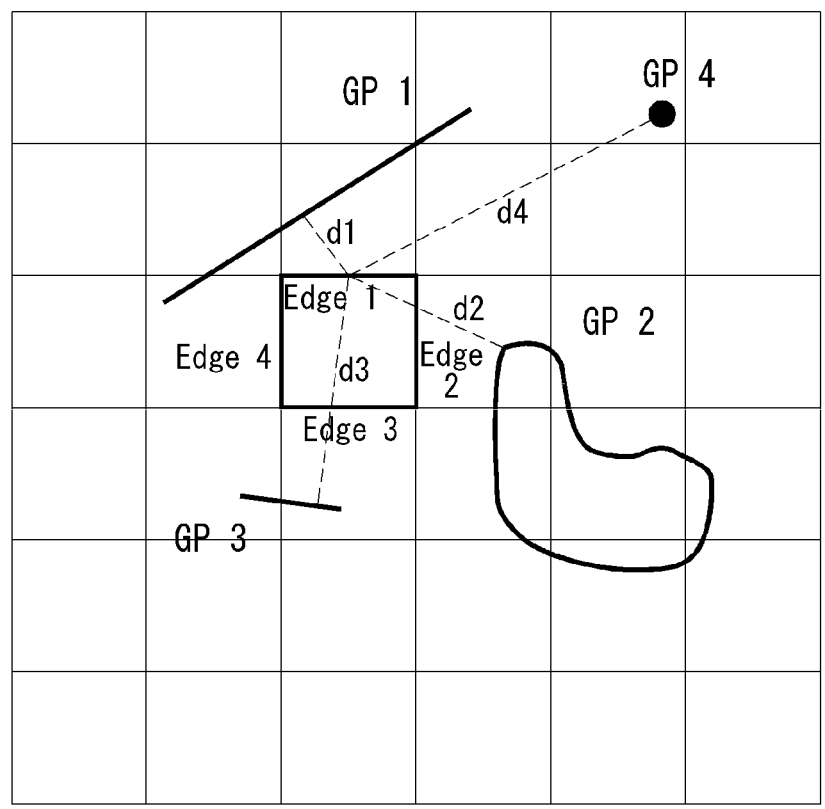

[Figure 9]
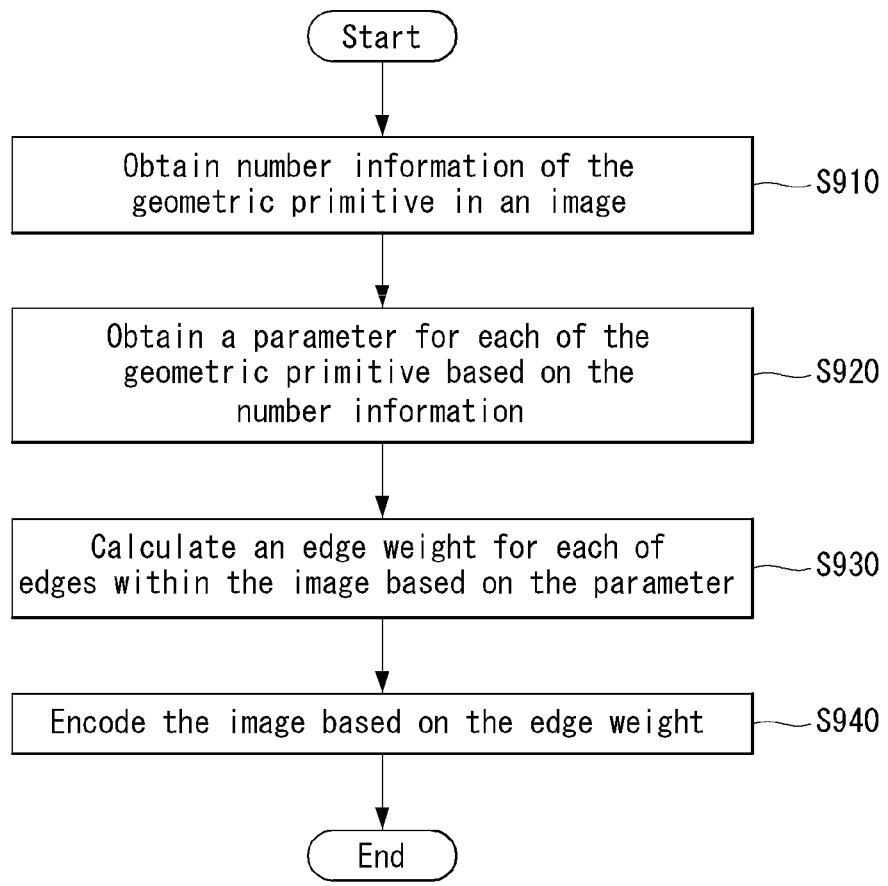

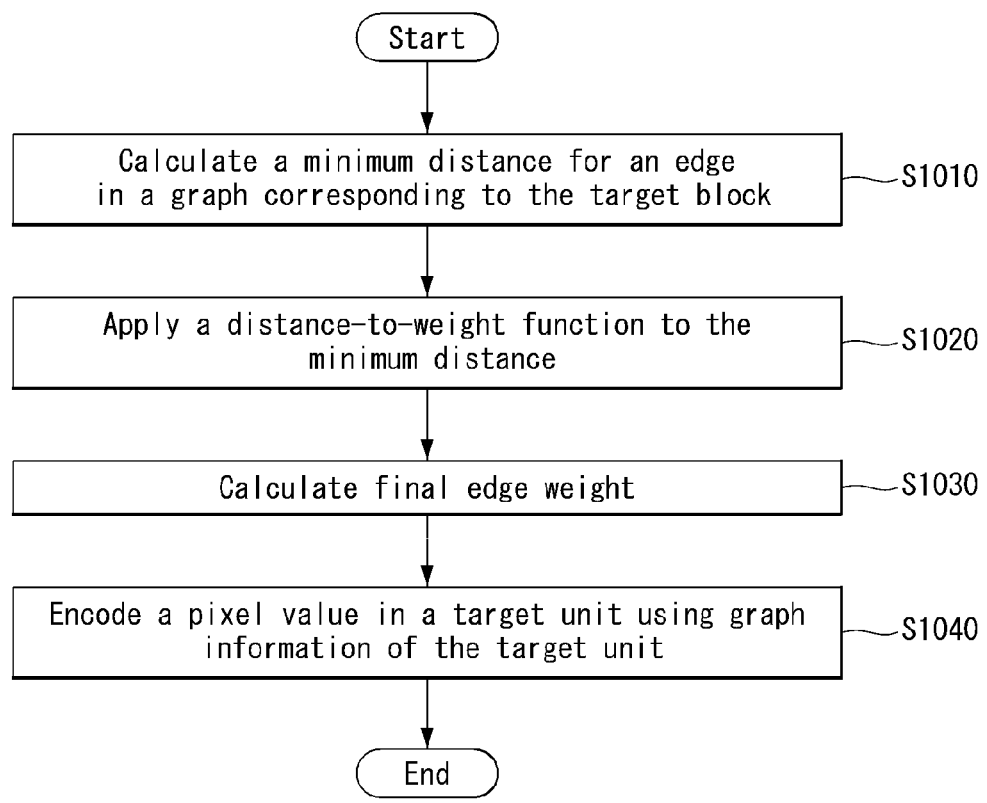
[Figure 10]

[Figure 11]
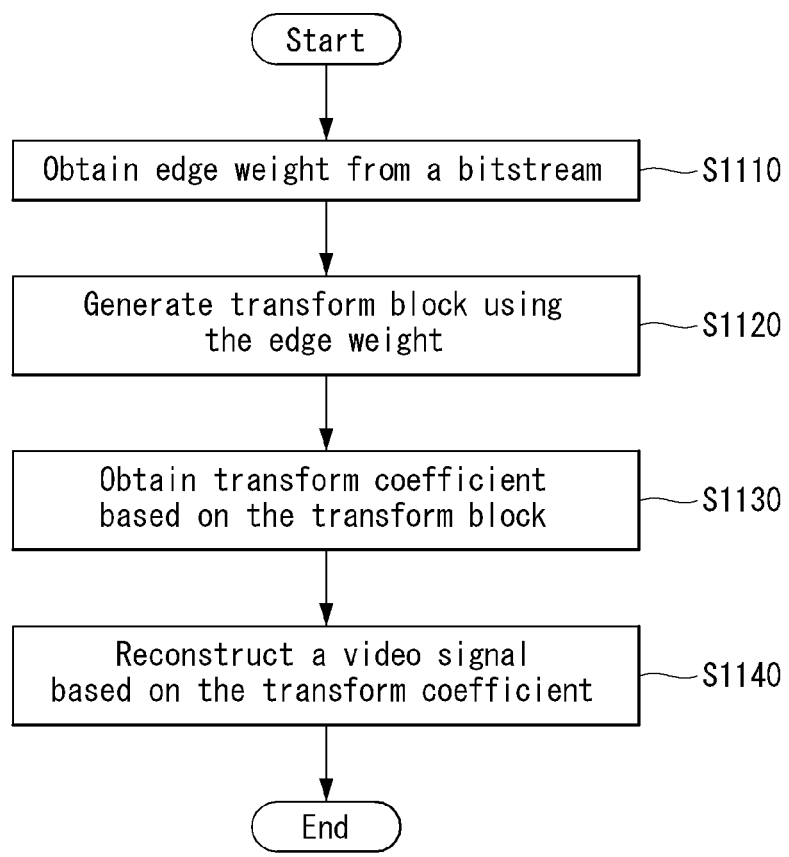

METHOD AND DEVICE FOR PROCESSING GRAPH-BASED SIGNAL USING GEOMETRIC PRIMITIVES

CROSS-REFERENCE TO RELATED APPLICATIONS

This application is the National Stage filing under 35 U.S.C. 371 of International Application No. PCT/KR2015/006430, filed on Jun. 24, 2015, which claims the benefit of U.S. Provisional Application No. 62/055,661, filed on Sep. 26, 2014, the contents of which are all hereby incorporated by reference herein in their entirety.

TECHNICAL FIELD

The present invention relates to a method and apparatus for processing a graph-based signal and, more particularly, to a technology for coding edge weights on graph-based signal.

BACKGROUND ART

Most of the traditional discrete-time signal processing techniques have evolved directly from processing and filtering analog signals, and thus have been constrained by several common assumptions, like sampling and processing only regularly organized data. The field of video compression is based on basically the same assumptions, but only generalized to multi-dimensional signals.

A graph is a useful type of data representation for describing a geometrical structure of data in various application fields. Signal processing based on graph representations can generalize concepts like sampling, filtering, Fourier transforms, etc., using graphs where each signal sample represents a vertex, and signal relationships are represented by graph edges with positive weights. This disconnects the signal from its acquisition process, so that properties like sampling rate and sequences can be replaced by the properties of graph. In fact, the traditional representations now become simply special cases, defined by some specific graph models.

DISCLOSURE

Technical Problem

Graph-based signal processing is a new discipline that generalizes several basic techniques and models of signal processing, and has shown promising results in various application fields. Its employment to signal compression has had one fundamental problem, which comes from the fact that both the encoder and decoder need to use exactly the same graph (vertexes, edges and edge weights) for deriving better signal transforms or prediction. Better signal compression can be achieved with graph structures that are complex and adaptive (i.e., change frequently), but the overhead of coding the information about those graphs can be relatively large, even larger than the coding gains they provide. Accordingly, the present invention solves these problems.

Technical Solution

This invention provides a broad set of solutions for coding graph information exploiting the fact that for video coding the graph topology is a fixed grid (commonly planar, since vertexes correspond to pixels), only edge weights change. And the objective is to develop graph-based tools for better coding sets of prediction residuals.

For coding edge weight on graphs designed for those cases, the present invention can use a set of one or more geometrics primitives (points, lines, circles, curves, etc.), and define edge weights using a specific function which is based on distance to points on those objects.

This way, the whole set of graph weights can be transmitted, independently of the graph size and complexity, by coding parameters that define those geometric primitives and parameters of the functions that translate distances into edge weights. Furthermore, different sets of geometric primitives and distance-to-weight functions allow a great deal of freedom in representing desirable graph features.

Advantageous Effects

The graph-based signal modeling to which the present invention is applied can be a powerful tool. Better signal representations, transforms and prediction can be obtained by adaptively changing the graph edge weights, and by using the matrices obtained from the spectral decomposition.

Furthermore, the present invention can cover the need for more general models, as required for data compression, and be advantageous to use tools for compression applications.

Furthermore, the present invention can avoid the excessive bit rate overhead required for encoding weights of individual graph edges by using a compact graph representation.

DESCRIPTION OF DRAWINGS

FIGS. 1 and 2 illustrate schematic block diagrams of an encoder and decoder which process a graph-based signal in accordance with embodiments to which the present invention is applied.

FIG. 3 represents examples of graphs used for modeling statistical relationships in 8×8 block within a video frame in accordance with an embodiment to which the present invention is applied.

FIG. 4 represents examples of 2 types of graphs showing distribution of weight in accordance with an embodiment to which the present invention is applied.

FIG. 5 represents a drawing for illustrating properties of a residual signal which tends to be clustered around the boundaries of objects in accordance with embodiments to which the present invention is applied.

FIG. 6 illustrates schematic block diagrams of graph-based signal modeling unit in accordance with an embodiment to which the present invention is applied.

FIG. 7 represents an example of a video frame containing various types of geometric primitives in accordance with an embodiment to which the present invention is applied.

FIG. 8 represents a drawing for illustrating how to code edge of block in a video segment using geometric primitives in accordance with an embodiment to which the present invention is applied.

FIG. 9 is a flowchart illustrating a process of coding edge of block in a video segment using geometric primitives in accordance with an embodiment to which the present invention is applied.

FIG. 10 is a flowchart illustrating a process of coding a graph-based signal based on a distance-to-weight function in accordance with an embodiment to which the present invention is applied.

FIG. 11 is a flowchart illustrating a process of decoding a video signal using an edge weight of a graph-based signal in accordance with an embodiment to which the present invention is applied.

BEST MODE

In accordance with an aspect of the present invention, there is provided a method of processing a graph-based signal using a geometric primitive, comprising: specifying the geometric primitive to be used for calculating an edge weight; obtaining a parameter for each of the geometric primitive; calculating an edge weight for each of edges within the image based on the parameter; and encoding the image based on the edge weight.

In accordance with another aspect of the present invention, the present invention further comprises calculating a minimum distance for an edge in a graph corresponding to the target block; and applying a distance-to-weight function to the minimum distance, wherein the edge weight is calculated based on the distance-to-weight function.

In accordance with another aspect of the present invention, the minimum distance indicates a distance from a center of an edge to the geometric primitive.

In accordance with another aspect of the present invention, the parameter includes at least one of type information, location information or length information.

In accordance with another aspect of the present invention, the present invention further comprises checking whether the type information is different from a default type: and encoding parameters of a distance-to-weight function when the type information is different from the default type.

In accordance with another aspect of the present invention, the type information of the geometric primitive indicates one of a predetermined set of the geometric primitive.

In accordance with another aspect of the present invention, each of the geometric primitive uses different distance-to-weight function.

In accordance with another aspect of the present invention, the edge weight is calculated by using another function.

In accordance with another aspect of the present invention, the image corresponds to a residual signal.

In accordance with another aspect of the present invention, the geometric primitive is identified by using a normalized space coordinate.

In accordance with an aspect of the present invention, there is provided a method of processing a graph-based video signal, comprising: receiving an edge weight; generating a transform matrix using the edge weight, wherein the transform matrix is mapped based on the edge weight of edges within a target block; obtaining a transform coefficient using the transform matrix; and reconstructing the graph-based video signal based on the obtained transform coefficient.

In accordance with an aspect of the present invention, there is provided an apparatus of encoding a graph-based signal using a geometric primitive, comprising: a processor configured to specify the geometric primitive to be used for calculating an edge weight, obtain a parameter for each of the geometric primitive, calculate an edge weight for each of edges within the image based on the parameter, and encode the image based on the edge weight.

In accordance with an aspect of the present invention, there is provided an apparatus of decoding a graph-based video signal, comprising: a processor configured to receive an edge weight, obtain a modified residual signal by applying the edge weight to a residual signal, and reconstructing the graph-based video signal based on the modified residual signal, wherein the transform matrix is mapped based on the edge weight of edges within a target block.

Mode For Invention

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, embodiments proposed in this specification is directed to video signal processing, but the present invention should not be construed as being based on only video signal processing, and will be applicable to a method of processing general graph-based signal.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process.

FIGS. 1 and 2 illustrate schematic block diagrams of an encoder and decoder which process a graph-based signal in accordance with embodiments to which the present invention is applied.

The encoder 100 of FIG. 1 includes a transform unit 110, a quantization unit 120, a dequantization unit 130, an inverse transform unit 140, a buffer 150, a prediction unit 160, and an entropy encoding unit 170.

The encoder 100 receives a video signal and generates a prediction error by subtracting a predicted signal, output by the prediction unit 160, from the video signal.

The generated prediction error is transmitted to the transform unit 110.

The transform unit 110 generates a transform coefficient by applying a transform scheme to the prediction error.

The quantization unit 120 quantizes the generated transform coefficient and sends the quantized coefficient to the entropy encoding unit 170.

The entropy encoding unit 170 performs entropy coding on the quantized signal and outputs an entropy-coded signal.

Meanwhile, the quantized signal output by the quantization unit 120 may be used to generate a prediction signal. For example, the dequantization unit 130 and the inverse transform unit 140 within the loop of the encoder 100 may perform a dequantization and an inverse transform on the quantized signal so that the quantized signal is reconstructed into a prediction error. A reconstructed signal may be generated by adding the reconstructed prediction error to a prediction signal output by the prediction unit 160.

The buffer 150 stores the reconstructed signal for the future reference of the prediction unit 160.

The prediction unit 160 generates a prediction signal using a previously reconstructed signal stored in the buffer 150. In this case, the present invention concerns efficient prediction of a region in a target image using a region in an anchor image. Efficiency can be in compression rate-distortion sense or in terms of related metrics such as mean-squared-error that quantify the distortion in the prediction error.

To provide better signal representation, transforms and prediction, the present invention will provide a method of modeling a graph-based signal, using geometric primitives and utilizing a function that maps distance to the geometric primitives to weights. Furthermore, the present invention provides a method of identifying a vertex and an edge within a graph, and encoding or decoding a residual signal. For example, embodiments of the present invention can perform various embodiments through graph-based signal modeling unit. The graph-based signal modeling unit may be included in the encoder 100 or the decoder 200.

The decoder 200 of FIG. 2 includes an entropy decoding unit 210, a dequantization unit 220, an inverse transform unit 230, a buffer 240, and a prediction unit 250.

The decoder 200 of FIG. 2 receives a signal output by the encoder 100 of FIG. 1.

The entropy decoding unit 210 performs entropy decoding on the received signal. The dequantization unit 220 obtains a transform coefficient from the entropy-decoded signal based on information about a quantization step size. The inverse transform unit 230 obtains a prediction error by performing inverse transform on the transform coefficient. A reconstructed signal is generated by adding the obtained prediction error to a prediction signal output by the prediction unit 250.

The buffer 240 stores the reconstructed signal for the future reference of the prediction unit 250.

The prediction unit 250 generates a prediction signal using a previously reconstructed signal stored in the buffer 240.

The graph-based signal modeling method to which the present invention is applied will be used in both the encoder 100 and the decoder 200.

FIG. 3 represents examples of graphs used for modeling statistical relationships in 8×8 block within a video frame in accordance with an embodiment to which the present invention is applied.

Referring to FIG. 3, the present invention provides two examples of the type of graph that can be used for processing blocks of 8×8 pixels in images or video. Each pixel is associated with a graph vertex, and the pixel value becomes the graph vertex value.

A graph edge may mean a line connecting graph vertexes. The graph edge is used to represent some form of statistical dependence in the signal, with a positive weight representing its strength. For example, each vertex can be connected to every other vertex, and a zero weight is assigned for edges connecting vertexes that are unrelated or weakly related. However, to simplify representation, edges having the zero weight can be completely removed.

In another embodiment of the present invention, the edges connecting the graph vertexes may be preset according to signal characteristics. For instance, vertexes can be arranged on 1-D arrays for audio signals, 2-D arrays for images, and 3-D arrays for video frames. In this case, a time axis can be used as third dimension. For example, in the graph of FIG. 3(a), the graph edges can be defined to connect each vertex to four of its nearest neighbors. However, the graph edges at block boundaries can be defined differently. Furthermore, in the graph of FIG. 3(b), they are connected to the eight nearest neighbors.

FIG. 4 represents examples of 2 types of graphs showing distribution of weight in accordance with an embodiment to which the present invention is applied.

While the graph's vertex values are independent variables representing signal measurements (commonly modeled as random variables), it is necessary to choose graph's edge weights that match some signals properties. In FIG. 4, two examples of graphs where the line colors for graph edges indicate different edge weights are provided. For instance, the dark lines may represent weights w=1 and the light lines represent weights w=0.2.

The graph in FIG. 4(a) can represent a case that has "weak links" along a straight line, where the graph has only 2 edge weights. In this case, the "weak links" means to have relatively smaller edge weights.

This is in fact commonly used in graph-based image processing, where this configuration can represent the disparity of pixels statistics on different sides of an image edge.

The basic tools used for graph-based signal processing may be derived from the graph's Laplacian matrix as equation 1.

$$L = D - A \qquad \text{[Equation 1]}$$

In equation 1, D is the degree diagonal matrix, and A is the adjacency matrix.

Many tools for the graph-based signal processing may be based on the spectral decomposition of L as equation 2.

$$L = U \Lambda U^{-1} \qquad \text{[Equation 2]}$$

In equation 2, the orthogonal matrix U provides a form of graph-based Fourier transform, which is specialized for the signals that fit the corresponding graph model.

A graph of FIG. 4(b) represents a distribution of edge weights which covers irregular regions, and the present invention provides a method of processing a signal using a distribution graph of edge weights.

FIG. 5 represents a drawing for illustrating properties of a residual signal which tends to be clustered around the boundaries of objects in accordance with embodiments to which the present invention is applied.

The present invention covers the need for more general models, as required for data compression. For instance, in coding applications, the signal to be processed is not the value of original pixels but a residual signal. For instance, it may be prediction residuals subtracted a predicted value from an original signal. FIG. 5(a) shows a video frame, and FIG. 5(b) shows distribution of the residual signal. For example, in FIG. 5(b), white represents zero value, black represents a value of the residual signal, and if black density is high, the value of the residual signal is large, if the black density is relatively low, the value of the residual signal is relatively small.

For this type of signal, the graphs do not have features like clearly defined edges, but instead have noisy samples clustered in certain areas. For those cases, a method for processing graphs with weight distributions covering irregular areas may be needed, as shown in the example of FIG. 4(b).

FIG. 6 illustrates schematic block diagrams of graph-based signal modeling unit in accordance with an embodiment to which the present invention is applied.

A video signal can be effectively processed via the graph-based signal modeling to which the present invention is applied. Better signal representations, transforms and prediction can be obtained by adaptively changing the graph weights, and by using the matrices obtained from the spectral decomposition of the graph's matrix L.

For maximum flexibility, it is necessary to constantly adapt the weights of the graph. The encoder can encode a graph-based signal by using data set of an input signal, and the decoder can receive the data set in whole or in part based on a predetermined order and decode the graph-based signal using the received data set.

In an embodiment of the present invention, the encoder can encode a part or all of data set about edge weights, and the decoder can compute new values of matrix L by decoding the part or all of the data set.

It is not easy to perform an efficient coding since even simple graphs like those in FIG. 3 have plural graph edges per vertex. For example, the graph with 4-connected vertexes for an N×N block of pixels has $2N(N-1) \approx 2N^2$ graph edges, while the 8-connected vertexes as FIG. 3(b) has $2(N-1)(2N-1) \approx 4N^2$ graph edges.

Meanwhile, encoding all the graph weights requires two, four, or more graph edges per vertex or per pixel. It is difficult to perform an efficient compression coding since this approach requires several bits to code an edge weight.

In an embodiment of the present invention, two different edge weights (e.g, 0.1 and 1) can be used for coding a graph edge. For example, assuming the probability of one of the weights is p, the present invention can use an entropy encoder with an optimal zero-order. In this case, the bit rate per graph edge may be represented as equation 3.

$$H(p) = p\log_2\left(\frac{1}{p}\right) + (1-p)\log_2\left(\frac{1}{1-p}\right)$$ [Equation 3]

In this case, the coding gains obtained by graph-based processing cannot be larger than 0.1 bit/pixel or 0.01 bit/pixel. Accordingly, the present invention provides a new method which can alleviate excessive overhead using more sophisticated coding methods for graph weight.

The bit rate overhead is required for encoding edge weights individually. The present invention provides a method for providing information related to plural graph edges simultaneously. For instance, common information for plural graph edges can be coded based on a predetermined level. In this case, the predetermined level includes a graph level, a frame (picture) level, a block level, a pixel level and various levels available for coding a video signal. This way, even if that information requires many bits for coding, the average bit rate per edge (and thus per pixel) can be maintained small.

The present invention may be based on the following particular properties of video coding.

Firstly, a graph used for processing pixel sets may be organized in a regular format. For example, the graph for an image can be organized as planar, or the graph for multi-dimensional spaces can be organized as rectangular lattice. In this case, only edge weights can be varied.

Secondly, a random residual signal tend to be clustered around the boundaries of video objects (people, wall, etc.), which normally are defined by 2D-curves but the present invention is not limited thereto and can be defined by 1D line or a point etc. While residual values are similar to each mostly in the regions where they are very small.

Thirdly, residual signals do not have exact boundaries each other, so it is not necessary to waste bits for encoding or decoding the precise location of which edge weights change.

An embodiment of the present invention can exploit the first property by signaling changes in statistics using general frame coordinates.

For instance, the present invention can identify vertexes and edges in all the graphs in a certain part of the video frame (or the whole frame) by using a normalized space S=[0, 1]×[0, 1]. For example, the present invention defines a weight function of a graph edge as equation 4.

$w: [0,1]×[0,1]->[0,1]$ [Equation 4]

In this case, a weight w(x) for each position x∈S can be obtained.

Assuming a set of W×H pixels, the position of a pixel (i, j) in S can be defined as equation 5.

$$x_{i,j} = \left(\frac{j}{W-1}, \frac{i}{H-1}\right), i = 0, 1,$$ [Equation 5]
$$..., H-1, j = 0, 1, ..., W-1$$

In this case, W indicates a width of a graph or a frame, and H indicates a height of the graph or the frame.

In another embodiment of the present invention, the actual weight of an edge between pixels (i, j) and (k, l) can be defined using the graph edge's mid-point as equation 6.

$w[(i,j),(k,l)]=w(\frac{1}{2}[x_{i,j}+x_{k,l}])$ [Equation 6]

In this case, w( ) indicates a weight function of a graph edge, and (i,j), (k,l) indicates a position of an arbitrary pixel. And, assuming a set of W×H pixels, i and k indicates 0, 1, . . . , W−1, and j and l indicates 0, 1, . . . , H−1.

With this approach, the overhead to code weights of all edges is independent of the number of edges, and depends only on efficiently coding information for computing w(x) for all x∈S.

Another embodiment of the present invention can perform an efficient coding by proposing how to compute a weight function w(x) using the second property. For example, the present invention can use the property that residual signals having large values are clustered so that they can organize geometric primitives.

In this case, the present invention can perform an efficient coding using a set of geometric primitives including at least one of geometric primitives, like points, lines, line segments, circles, lines using cubic splines, Bezier curves, etc.

For instance, FIG. 7 shows an example of a video frame which has some geometric primitives, like isolated points, and straight and curved lines.

Another embodiment of the present invention is to use the last property, and use a function φ(d, P1, P2) that maps distance to the geometric primitives to weights (hereinafter, "distance-to-weight function") to complete the definition of $w(x)^2$. For example, the distance-to-weight function can be defined as equations 7 and 8.

$\phi(d,\mu,\eta)=2^{-|\mu d|^\eta}$ [Equation 7]

Where d is a distance from a target unit to the geometric primitives, µ,η indicate additional parameters. For example, the target unit means a processing unit for measuring an edge weight, and includes at least one of a vertex, a pixel, an edge, a block or a frame. And, a reference point for measuring a distance d may be a vertex, a pixel or an edge. Meanwhile, the additional parameters include at least one of a scale parameter and a change parameter, for example, µ indicates the scale parameter and η indicates the change parameter.

$\bar{\phi}(d,\mu,\eta)=1-2^{-|\mu d|^\eta}$ [Equation 8]

In this case, equation 8 indicates complement of equation 7. For example, a shape of graphs of distance-to-weight function can be altered by the change parameter η. And, for the distance d, a size of d can be scaled by the scale parameter μ. Furthermore, distance-to-weight function can be defined for different types of geometric primitives and distance measures.

Meanwhile, referring to FIG. 6, graph-based signal modeling unit (600) includes graph generation unit (610), geometric primitive encoding unit (620) and edge weight encoding unit (630).

The graph-based signal modeling unit (600) to which the present invention is applied can code edge weights based on the distance-to-weight function. Furthermore, the graph-based signal modeling unit (600) can code a set of one or more reference geometrics primitives in a graph corresponding a target block. The set of one or more reference geometrics primitives can be used to determine edge weights.

The graph generation unit (610) can generate a graph corresponding a target image. For example, the graph's Laplacian matrix, such as equation 1, can be used for graph-based signal processing.

The geometric primitive encoding unit (620) can encode the geometric primitives in the generated graph. In this case, the geometric primitives can be defined by various parameters. For example, the geometric primitives can be defined by at least one of type information and location information of geometric primitive. The type information includes at least one of point type, line type, circle type, line type using cubic splines, or Bezier curve type.

And, the geometric primitive encoding unit (620) can encode the number of geometric primitives within a video frame. In this case, the video frame may be a residual component. According to the number of geometric primitives, the geometric primitive encoding unit (620) can obtain type information of each of geometric primitives and its parameters.

The edge weight encoding unit (630) can encode edge weight based on the distance-to-weight function. For instance, the present invention can compute weights for edges of a target unit based on a distance from a reference point of the target unit to a geometric primitive, in this case, the distance-to-weight function can be used to compute weights for edges of the target unit.

Specifically, the edge weight encoding unit (630) can calculate the minimum distance from the center of the edge to each of the geometric primitives. And, the edge weight encoding unit (630) can calculate an edge weight based on the minimum distance, in this case, the distance-to-weight function can be used to compute the edge weight. The edge weight can be encoded and transmitted to a decoder.

The edge weight encoding unit (630) apply the distance-to-weight function to each minimum distance, and can calculate a final edge weight based on the results. The process can be performed for a target unit of a video signal.

The edge weight encoding unit (630) can encode values of all pixels in the block based on the distance-to-weight function.

FIG. 7 represents an example of a video frame containing various types of geometric primitives in accordance with an embodiment to which the present invention is applied.

An embodiment of the present invention can compute the distance-to-weight function based on the property that large residuals are clustered in simple geometric configurations. The present invention can encode or decode those features efficiently by using a set of geometric primitives including at least one of geometric primitives. For instance, FIG. 7 shows an example of a video frame which has some geometric primitives, like isolated points, and straight and curved lines.

In FIG. 7, the geometric primitives can be defined by type information. For instance, the type information may include at least one of a point, a line, a line segment, a circle, a line using cubic splines, or Bezier curves.

For example, referring to FIG. 7, the type information GP1 (Geometric Primitive 1) indicates the line using cubic splines, the type information GP2 (Geometric Primitive 2) and GP3 (Geometric Primitive 3) indicate a line segment, the type information GP4 indicates connected line segments, and GP N indicates a point.

In FIG. 7, the thin gray lines represent a coding unit for processing a video frame or a target unit for calculating an edge weight, and various colors of the geometric primitives can be defined for identifying distribution of edge weights.

In another embodiment of the present invention, a geometric primitive can be defined based on position information. For example, the geometric primitive can be defined by using coordinate information of a video frame or position information of a pixel. Or, the geometric primitive can be defined by using binary data.

In another embodiment of the present invention, a geometric primitive can be defined by another way based on type information. For example, a type of a point can be defined by coordinate information, and types of a line, a line segment, a circle, a line using cubic splines, and Bezier curves can be defined by a coordinate function.

FIG. 8 represents a drawing for illustrating how to code edge of block in a video segment using geometric primitives in accordance with an embodiment to which the present invention is applied.

The blocks of FIG. 8 show a portion of a video segment which has some geometric primitives, and a block with the bold line represents a target block.

Referring to FIG. 8, the video segment has 4 geometric primitives, such as a point (GP4), two line segments (GP1, GP3), a line using cubic splines (GP2).

First, the encoder can encode number information of the geometric primitives. For example, since a video segment in FIG. 8 has 4 geometric primitives, the encoder can encode a corresponding value as number information of the geometric primitives.

And, for each of the 4 geometric primitives, the encoder can encode type information of the geometric primitives. For example, in case of GP1, the encoder can encode type information of GP1 as a long line segment.

If the type of the 'long line segment' is not a default type, the encoder can encode parameters of the distance-to-weight function to be used for GP1.

Next, the encoder can encode edge weight based on the distance-to-weight function. The edge weight may be determined based on the minimum distance from the center of the edge to each of the geometric primitives.

For example, referring to FIG. 8, a block with a bold line represents a target unit, the target unit includes 4 edges, such as edge 1, edge 2, edge 3, and edge 4. Accordingly, for calculating edge weights of the target unit, the minimum distances from the center of each of the 4 edges to the geometric primitives can be calculated. For example, in case of the edge 1, the minimum distances d1, d2, d3 and d4 (dotted line) can be calculated by measuring distances from the center of the edge 1 to each of the geometric primitives. The encoder can obtain an edge weight of the edge 1 based on the calculated minimum distances. In this case, the distance-to-weight function can be used for obtaining the edge weight of the edge 1.

For the edge 2 to the edge 4, the encoder can repeatedly perform the above process for obtaining the edge weight of the edge 1 in the same manner. The encoder can encode a pixel value in the target unit by using the edge weight calculated according to the above process. For example, the encoder can perform a transform or a prediction for the target unit using the edge weight, and thereby encode the target unit. In this case, the target unit can include original data, predicted data or residual data.

In another embodiment of the present invention, the present invention can use only some geometric primitives within a video frame to determine an edge weight. For example, the edge weight can be determined by using only the nearest geometric primitive from a target edge. Specifically, referring to FIG. 8, in case of edge 1, the nearest geometric primitive GP1 can be selected, and the minimum distance d1 from the center of the edge 1 to the nearest geometric primitive GP1 can be calculated. The encoder can obtain an edge weight of the edge 1 based on the calculated minimum distance d1. In this case, the distance-to-weight function can be used for obtaining the edge weight of the edge 1.

In another embodiment of the present invention, the present invention can use an edge weight of a previously-determined edge to determine an edge weight. For example, the previously-determined edge can be an edge of a current target unit or an edge of another unit. In this case, the another unit means a unit except for the current target unit within a video frame. Specifically, the edge weight can be determined by using an edge weight of an edge neighboring to a current edge. For example, referring to FIG. 8, we assume that the edge weight is determined in order of edge 1, edge 2, edge 3 and edge 4. When determining an edge weight of the edge 4, the encoder can use at least one of other edges of a current target unit, i.e. edge 1, edge 2 and edge 3. For example, an edge weight of any one of edge 1, edge 2 or edge 3 can be used as the edge weight of the edge 4. Or, edge weights of any two of edge 1, edge 2 or edge 3 can be used for calculating the edge weight of the edge 4, or a median value of 3 edges can be used for that.

In another embodiment of the present invention, the edge weight can be predicted by using an edge of another unit, which is neighboring to the edge 1. For example, in case of edge 1, the edge weight of the edge 1 can be predicted by using at least one of edges of upper block, upper-left block, upper-right block, bottom-left block, or bottom-right block, which is neighboring to the edge 1.

In another embodiment of the present invention, the edge weight can be also predicted by using an edge weight of edges of a block within another frame as well as a current frame.

FIG. 9 is a flowchart illustrating a process of coding edge of block in a video segment using geometric primitives in accordance with an embodiment to which the present invention is applied.

The encoding method to which the present invention is applied may be described by the following algorithm. For example, the present invention can repeatedly perform the encoding method for each video segment, such as a coding block, a frame, or a set of those, etc.

The encoder can encode the number N of geometric primitives used for the segment (S910).

For each geometric primitive n=1, 2, . . . , N, the encoder can encode type information of geometric primitive and an additional parameter (S920). If type information of geometric primitive is different from a default type, the encoder can encode parameters of the distance-to-weight function to be used for the geometric primitive. For example, the additional parameter includes at least one of a scale parameter and a change parameter.

Specifically, a shape of graphs of distance-to-weight function can be altered by the change parameter. Also, a size of the distance d, which is a variable of the distance-to-weight function, can be adjusted by the scale parameter.

Furthermore, the following processes can be performed for each block in the video segment.

For each edge of a target unit in the graph, the encoder can calculate the minimum distance from the center of the edge to each of the geometric primitives and obtain an edge weight based on the calculated minimum distance (S930).

Then, the encoder can encode pixel values in the target unit using the edge weight of a target unit (S940). In this case, the target unit can include original data, predicted data or residual data.

FIG. 10 is a flowchart illustrating a process of coding a graph-based signal based on a distance-to-weight function in accordance with an embodiment to which the present invention is applied.

The graph-based signal modeling unit (600) can code a graph-based signal based on a distance-to-weight function.

For example, the edge weight encoding unit (630) can calculate the minimum distance from the center of the edge to each of the geometric primitives (S1010).

And, the edge weight encoding unit (630) can apply the minimum distance to the distance-to-weight function (S1020), and calculate the final edge weight based on the results (S1030). The above process can be performed for each target unit in a video segment.

Then, the edge weight encoding unit (630) can use graph information of the target unit to encode a pixel value in the target unit (S1040). In this case, the graph information can include at least one of an edge weight, type information of a geometric primitive and an additional parameter.

In another embodiment of the present invention, the geometric primitive may be a pre-defined set of geometric primitives. The distance-to-weight function can map nearest-distance to a geometric primitive to a weight.

In another embodiment of the present invention, the present invention provides a method to combine weights from different geometric primitives.

For instance, a single function may be utilized to combine weights from different geometric primitives. The single function has the single value of d that is the minimum distance to the nearest primitive.

In another embodiment of the present invention, different functions may be assigned for each of the geometric primitives. For example, another function may be utilized to calculate the edge weight, as equations 9 and 10.

$$w = \max\{\phi_1(d_1, \ldots), \phi_2(d_2, \ldots), \ldots, \phi_N(d_N, \ldots)\} \quad \text{[Equation 9]}$$

$$w = \text{median}\{\phi_1(d_1, \ldots), \phi_2(d_2, \ldots), \ldots, \phi_N(d_N, \ldots)\} \quad \text{[Equation 9]}$$

In equations 9 and 10, $\varphi n(d, \ldots)$ (n=1, 2, . . . , N) indicates N distance-to-weight functions which are different from each other, for each of geometric primitives. The equation 9 represents a maximum value of edge weights, which are calculated based on the N distance-to-weight functions, and the equation 10 represents a median value of edge weights, which are calculated based on the N distance-to-weight functions.

In another embodiment of the present invention, the above embodiments can be applied to fixed blocks, like those obtained by intra-frame prediction. And, the parameters of geometric primitives can be coded by using motion compensation.

Furthermore, the above embodiments can be extended to higher dimensional spaces. For example, the present invention can define geometric primitives of embedded in a $[0, 1]^P$ space and use a function w (x), where $x \in [0, 1]^P$.

FIG. 11 is a flowchart illustrating a process of decoding a video signal using an edge weight of a graph-based signal in accordance with an embodiment to which the present invention is applied.

A decoder can receive, as a syntax element, an edge weight of a graph-based signal from an encoder (S1110). For example, the edge weight may be included in at least one of sequence information, picture information, a slice header, slice data, a coding unit, a transform unit, a coding syntax of a residual signal, and a block unit, and may be transmitted. Or, the edge weight may be derived from another information in the decoder, for example, the edge weight may be derived from a parameter related to the geometric primitive.

In an embodiment of the present invention, a decoder can obtain the edge weight, and use the edge weight for generating a transform block (S1120). For example, the transform block may be represented by a transform matrix, and each rows and columns of the transform matrix may be set to an edge weight for each of edges within a target unit.

And, the decoder can decode the transform coefficient based on the transform block (S1130).

The decoder reconstructs a residual signal based on the transform coefficient, and generates a reconstructed signal by adding the residual signal to a prediction signal (S1140).

In another embodiment of the present invention, a decoder can obtain an edge weight, and use the edge weight for modifying a residual signal. For example, the decoder can obtain a modified residual signal by applying the edge weight to the residual signal.

The decoder can generate a reconstructed signal by adding the modified residual signal, which is obtained via the above process, to a prediction signal.

In another embodiment of the present invention, the decoder can obtain an edge weight, and use the edge weight for generating a prediction signal.

In another embodiment of the present invention, the encoder can use the edge weight for generating a transform block signal or a prediction signal.

In another embodiment of the present invention, the encoder can generate a residual signal, and modify the residual signal by applying the edge weight to the generated residual signal. In other words, the encoder can generate a modified residual signal by applying the edge weight to the residual signal. In this case, since a decoder receives the modified residual signal, the decoder does not need to receive the edge weight, or can use the edge weight for generating a prediction signal.

In another embodiment of the present invention, a decoder can receive, as a syntax element, a parameter related to a geometric primitive of a graph-based signal from an encoder. For example, the parameter can include at least one of type information, number information and an additional parameter of the geometric primitive, and aforementioned embodiments in this description can be applied to this embodiment. The decoder can derive an edge weight based on the parameter.

Via the above process, a decoder can derive the edge weight, and use the edge weight for modifying a residual signal. For example, the decoder can obtain a modified residual signal by applying the edge weight to the residual signal. And, the decoder can generate a reconstructed signal by adding the modified residual signal to a prediction signal.

As described above, the embodiments explained in the present invention may be implemented and performed on a processor, a micro processor, a controller or a chip. For example, functional units explained in FIGS. 1, 2, and 6 may be implemented and performed on a computer, a processor, a micro processor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:
1. A method of processing a graph-based signal using a geometric primitive, comprising:
   specifying, by a processor, the geometric primitive to be used for calculating an edge weight;
   obtaining, by the processor, a parameter for the geometric primitive, wherein the parameter comprises type information, location information, and length information;
   calculating, by the processor, an edge weight for edges within an image based on the parameter; and
   encoding, by the processor, the image based on the edge weight,
   wherein calculating the edge weight further comprises:
      calculating, by the processor, a minimum distance for an edge in a graph corresponding to a target block; and applying, by the processor, a distance-to-weight function to the minimum distance,
  wherein the edge weight is calculated based on the distance-to-weight function.

2. The method of claim 1, wherein the minimum distance indicates a distance from a center of an edge to the geometric primitive.

3. The method of claim 1, further comprising:
   checking, by the processor, whether the type information is different from a default type: and
   encoding, by the processor, parameters of a distance-to-weight function when the type information is different from the default type.

4. The method of claim 1, wherein the type information indicates one of a predetermined set of the geometric primitive.

5. The method of claim 1, wherein the geometric primitive uses a distance-to-weight function that is different from that of another geometric primitive.

6. The method of claim 5, wherein the edge weight is calculated by using another function.

7. The method of claim 1, wherein the image corresponds to a residual signal.

8. The method of claim 1, wherein the geometric primitive is identified by using a normalized space coordinate.

9. A method of processing a graph-based video signal, comprising:
   receiving, by a processor, an edge weight;
   generating, by the processor, a transform matrix using the edge weight, wherein the transform matrix is mapped based on the edge weight of edges within a target block;
   obtaining, by the processor, a transform coefficient using the transform matrix; and
   reconstructing, by the processor, the graph-based video signal based on the obtained transform coefficient,
   wherein the edge weight has been calculated based on a distance-to-weight function which is applied to a minimum distance, and
   wherein the minimum distance indicates a distance from a center of an edge of the target block to a geometric primitive.

10. An apparatus of encoding a graph-based signal using a geometric primitive, comprising:
    a processor configured to:
    specify the geometric primitive to be used for calculating an edge weight,
    obtain a parameter for each of the geometric primitive, wherein the parameter comprises type information, location information, and length information,
    calculate an edge weight for each of edges within the image based on the parameter, and
    encode the image based on the edge weight,
    wherein the processor is further configured to:
      calculate a minimum distance for an edge in a graph corresponding to a target block, and
      apply a distance-to-weight function to the minimum distance,
      wherein the edge weight is calculated based on the distance-to-weight function.

11. An apparatus of decoding a graph-based video signal, comprising:
    a processor configured to:
    receive an edge weight,
    obtain a modified residual signal by applying the edge weight to a residual signal, and
    reconstruct the graph-based video signal based on the modified residual signal,
    wherein the transform matrix is mapped based on the edge weight of edges within a target block,
    wherein the edge weight has been calculated based on a distance-to-weight function which is applied to a minimum distance, and
    wherein the minimum distance indicates a distance from a center of an edge of the target block to a geometric primitive.

* * * * *